(12) United States Patent
Chen

(10) Patent No.: US 7,088,589 B2
(45) Date of Patent: Aug. 8, 2006

(54) MECHANICAL AND AUTOMATIC LIQUID CRYSTAL DISPLAY DEVICE

(75) Inventor: Tonny Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 10/775,200

(22) Filed: Feb. 11, 2004

(65) Prior Publication Data

US 2005/0174724 A1    Aug. 11, 2005

(51) Int. Cl.
*G06F 1/16* (2006.01)
(52) U.S. Cl. ............... 361/725; 312/223.1; 312/223.2
(58) Field of Classification Search ............ 361/679, 361/681, 682, 683, 724–727; 248/917–923; 312/223.1, 223.2; 345/905; 348/552; 369/69; 349/58; 353/119–122
See application file for complete search history.

(56) References Cited

U.S. PATENT DOCUMENTS

| | | | | |
|---|---|---|---|---|
| 6,012,785 A * | 1/2000 | Kawasaki | ................ | 312/29 |
| 6,205,021 B1 * | 3/2001 | Klein et al. | ................ | 361/683 |
| 6,462,670 B1 * | 10/2002 | Bolognia et al. | ...... | 340/815.45 |
| 6,754,070 B1 * | 6/2004 | Chen | ................ | 361/683 |
| 2002/0101117 A1 * | 8/2002 | Shibuya | ................ | 307/9.1 |

* cited by examiner

*Primary Examiner*—Lynn Feild
*Assistant Examiner*—Anthony Q. Edwards
(74) *Attorney, Agent, or Firm*—Troxell Law Office, PLLC (57) ABSTRACT

A mechanical and automatic liquid crystal display (LCD) device and particularly to a mechanical and automatic LCD device for automatically and rapidly unloading and storing the LCD panel that is especially suitable for a LCD device which has a display panel foldable upwards for storing includes a case for housing an extendable deck, a coupling mechanism, a display panel holding mechanism and an upward folding actuation means. The structure thus formed can replace the expensive electronic circuit control to enable users to automatically and rapidly unload or retract and store the display panel, and also adjust and remember the viewing angle of the display panel to meet user's requirements.

12 Claims, 11 Drawing Sheets

MECHANICAL AND AUTOMATIC LIQUID CRYSTAL DISPLAY DEVICE

BACKGROUND OF THE INVENTION

1. Field of the Invention

The present invention relates to a mechanical and automatic liquid crystal display (LCD) device and particularly to a mechanical and automatic LCD device for automatically and rapidly unloading and storing the LCD panel that is especially suitable for a LCD device which has a display panel foldable upwards for storing, and also has an viewing angle that may be adjusted and remembered to suit user's requirements.

2. Description of the Prior Art

With increasing developments of technology and economics, people have growing demands for leisure, recreation and information. As a result, telematics products such as video and audio devices for use in cars and mobile information equipment have been developed and introduced. Among them Liquid crystal display (LCD) device is an indispensable facility. For the car use LCD devices now on the market, folding and storing operations generally can be categorized into three types, i.e. fully automatic, semi-automatic and manual. The fully automatic type employs electric and precise electronic elements to do control function. The display panel of the display device may be unfolded and turned and anchored on a desired position by one push. However it is very expensive. The semi-automatic and manual types have to be turned and adjusted by people manually to set the display panel at a desired position. While they are less expensive, they are not convenient for use. Hence the conventional display devices all have their share of problems, either expensive or inconvenient to use. There is still room for improvement.

SUMMARY OF THE INVENTION

In view of the aforesaid disadvantages, the present invention aims to provide a mechanical and automatic LCD device. It employs mechanical elements to substitute the expensive electronic circuit control, and enables users to automatically and rapidly unload and store the display panel. The viewing angle of the display panel may be adjusted according to user's requirements, and the adjusted angle may also be remembered for reuse.

In order to achieve the foregoing object, the mechanical and automatic LCD device according to the invention mainly includes a case which houses an extendable deck, a coupling mechanism, a display panel holding mechanism and an upward folding adjustment means. By means of the invention users can rapidly unload and store the display panel. The viewing angle of the display panel may be adjusted according to user's requirements, and the adjusted angle may also be remembered for reuse.

In one aspect of the invention, the case is hollow and has a window, and has a first channeling mechanism and a second channeling mechanism located respectively on two sides corresponding to each other to guide the extendable deck to retract inwards or extend outwards at desired locations.

In another aspect of the invention, the extendable deck has a front side pivotally coupled with the display panel holding mechanism, and also is coupled with the first and the second channeling mechanisms for positioning.

In yet another aspect of the invention, the coupling mechanism is located on one side of the extendable deck to control folding, latching and releasing of the display panel holding mechanism.

In still another aspect of the invention, the display panel holding mechanism includes a panel for holding a LCD panel and has an upward folding adjustment means housing zone on the back side thereof.

In another aspect of the invention, the upward folding adjustment means is located in the display panel holding mechanism linking to the extendable deck, and includes an upward folding actuation assembly and an angle adjustment assembly.

The foregoing, as well as additional objects, features and advantages of the invention will be more readily apparent from the following detailed description, which proceeds with reference to the accompanying drawings.

DESCRIPTION OF THE PREFERRED EMBODIMENT

Referring to FIGS. 1, 2, 3 and 4, the mechanical LCD device according to the invention mainly includes a case 1 which houses an extendable deck 2, a coupling mechanism 3, a display panel holding mechanism 4 and an upward folding adjustment means 5.

Figure 1:
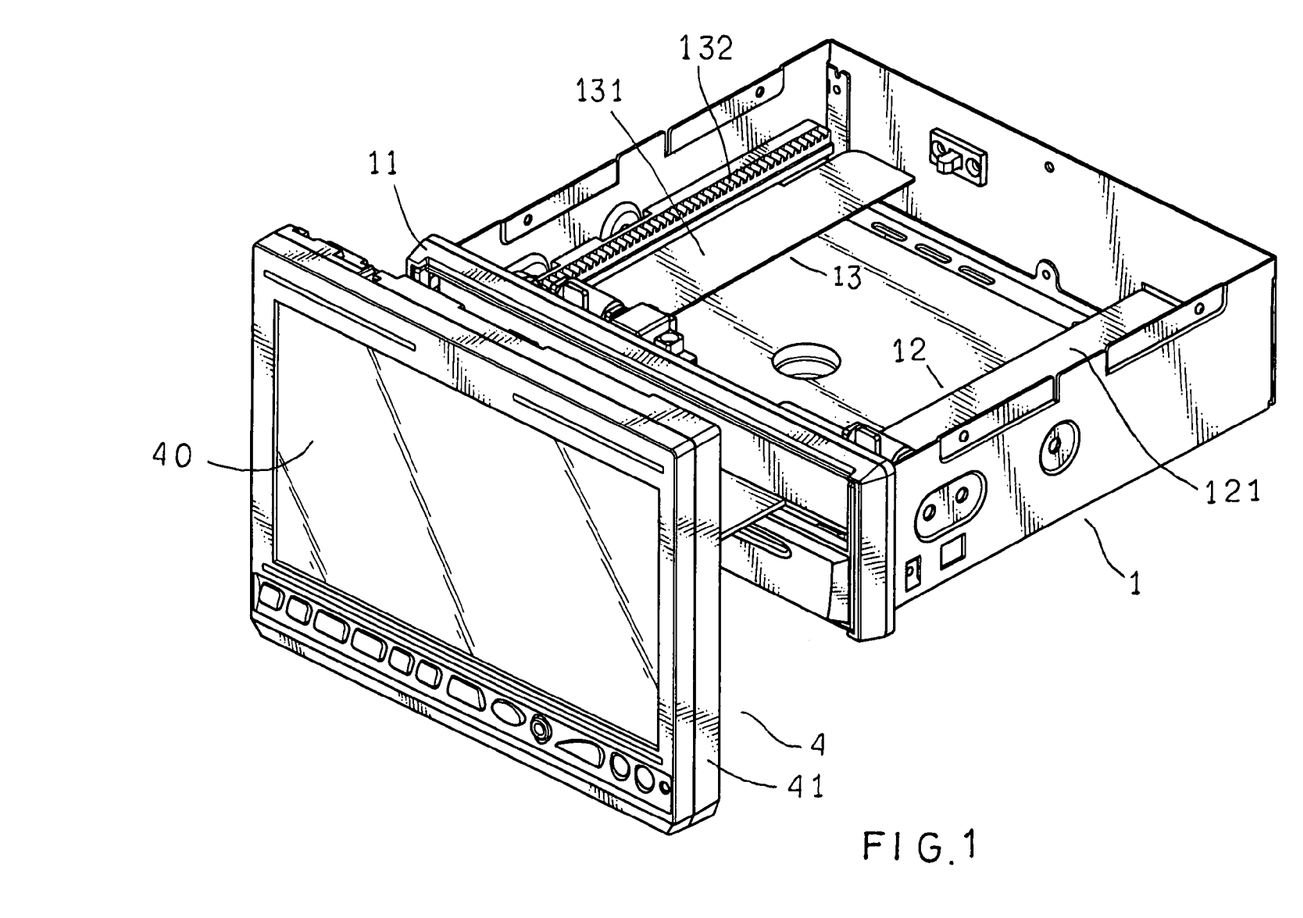
FIG. 1 is a perspective view of the invention.
Figure 2:
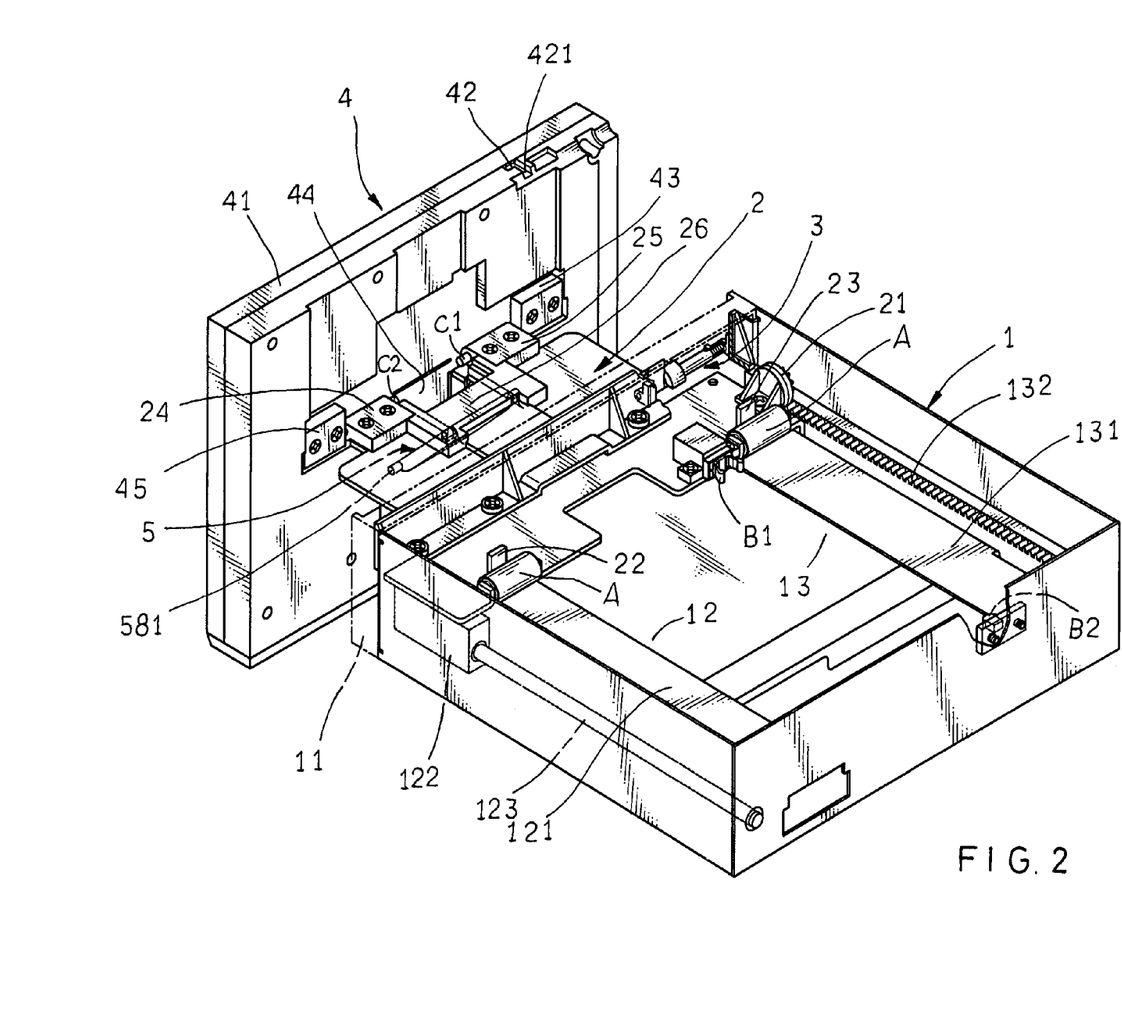
FIG. 2 is another perspective view of the invention.

The case 1 is hollow and has a face panel 11 at the front end with a window 111 formed thereon to allow the display panel holding mechanism 4 and related elements to be extended outwards. On one side of the window 111, there is a slant bucking member 112. The case 1 has a first channeling mechanism 12 and a second channeling mechanism 13 located respectively on two sides corresponding to each other to guide the extendable deck 2 to retract inwards the case 1 or extend outwards at desired locations. The first channeling mechanism 12 has a first elevation sustaining plate 121 and a sliding rod 123 coupling on a sliding block 122. The second channeling mechanism 13 has a second elevation sustaining plate 131 and a gear rack 132.

The extendable deck 2 is located above the elevation sustaining plates 121 and 131 and may be extended outside the case 1 through the window 111. The extendable deck 2 has a rear section with one side fastening to the sliding block 122 of the first channeling mechanism 12 and another side has a damper 21 engaging with the gear rack 132 of the second channeling mechanism 13. The rear end of the extendable deck 2 also has respectively a push lug 22 and 23 on two sides to ram against an elastic reel A located at the front end of the elevation sustaining plates 121 and 131. The push lug 23 has a binary switch B1 on an inner side corresponding to a latch tongue B2 located on the rear side of the case 1. The front end of the extendable deck 2 has respectively a first and a second pivot seat 24 and 25 fastened to two sides thereof. The first and the second pivot seats 24 and 25 are bridged by a connection deck 26.

Figure 3:
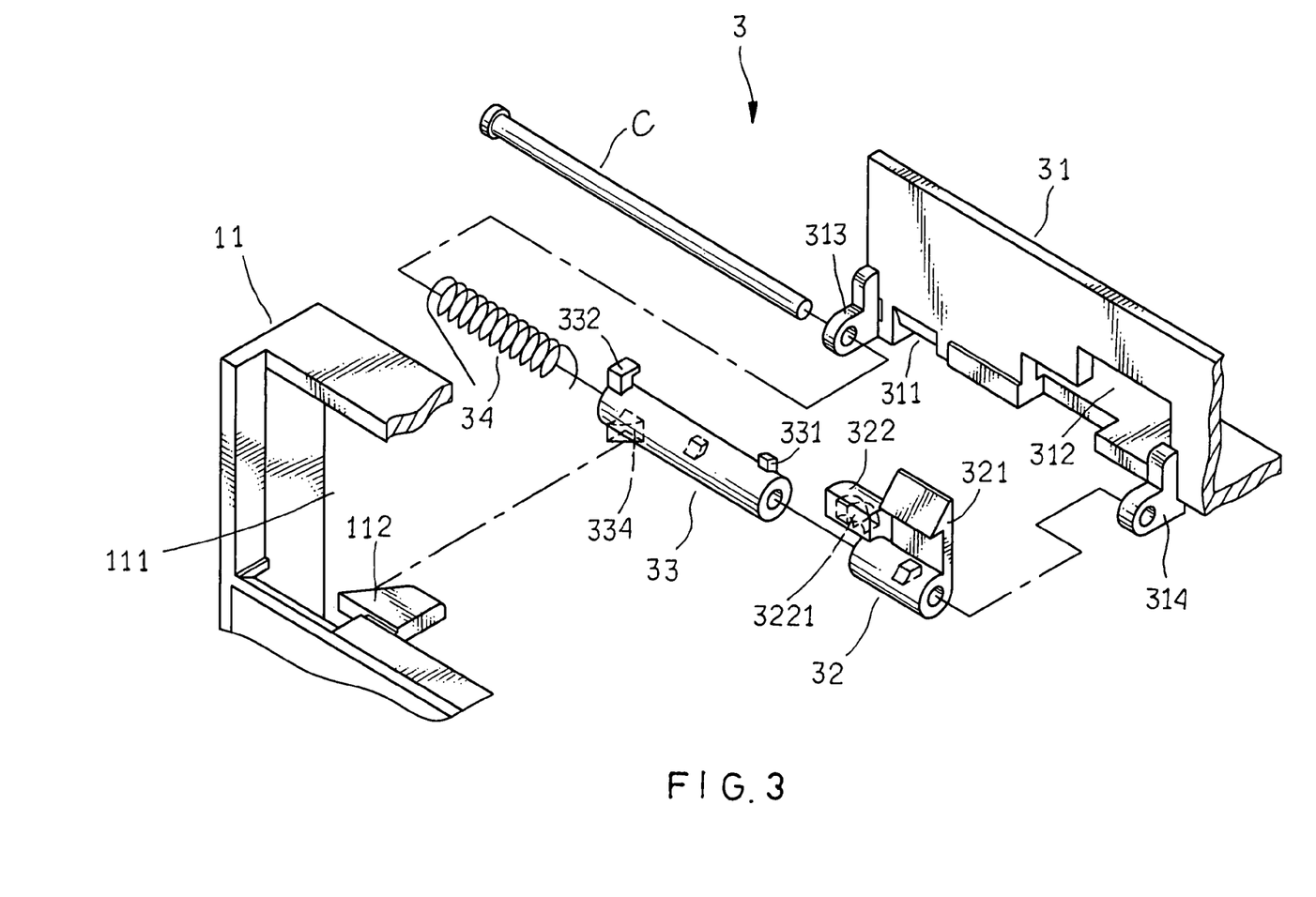
FIG. 3 is an exploded view of the coupling mechanism of the invention.

The coupling mechanism 3 (referring to FIG. 3) is located on one side of the extendable deck 2 to control folding, latching and releasing of the display panel holding mechanism 4. It includes:

a partition 31 located above the extendable deck 2 having a torsional spring housing zone 311 and a notch 312 on one side, and two axle holding docks 313 and 314 extended from two ends adjacent to the notch 312;

a hollow first hub 32 for housing an axle C having a hook 321 on one side that has a slant surface and a projection 322 on another side. The projection 322 has a trough 3221 on a rear side;

a hollow second hub 33 for housing the axle C having a lug 331 on one side corresponding to the trough 3221 and a L-shaped strut 332 extended outwards from another side, and a slant bucking block 334 on another side opposite to the L-shaped strut 332 corresponding to the slant bucking member 112 of the face panel 11; and a torsional spring 34 having one end engaging with the L-shaped strut 332 and other end pressing the torsional spring housing zone 311 of the partition 31. The torsional spring 34 pushes the first and the second hubs 32 and 33 to one side of the partition 31 in normal conditions.

Figure 4:
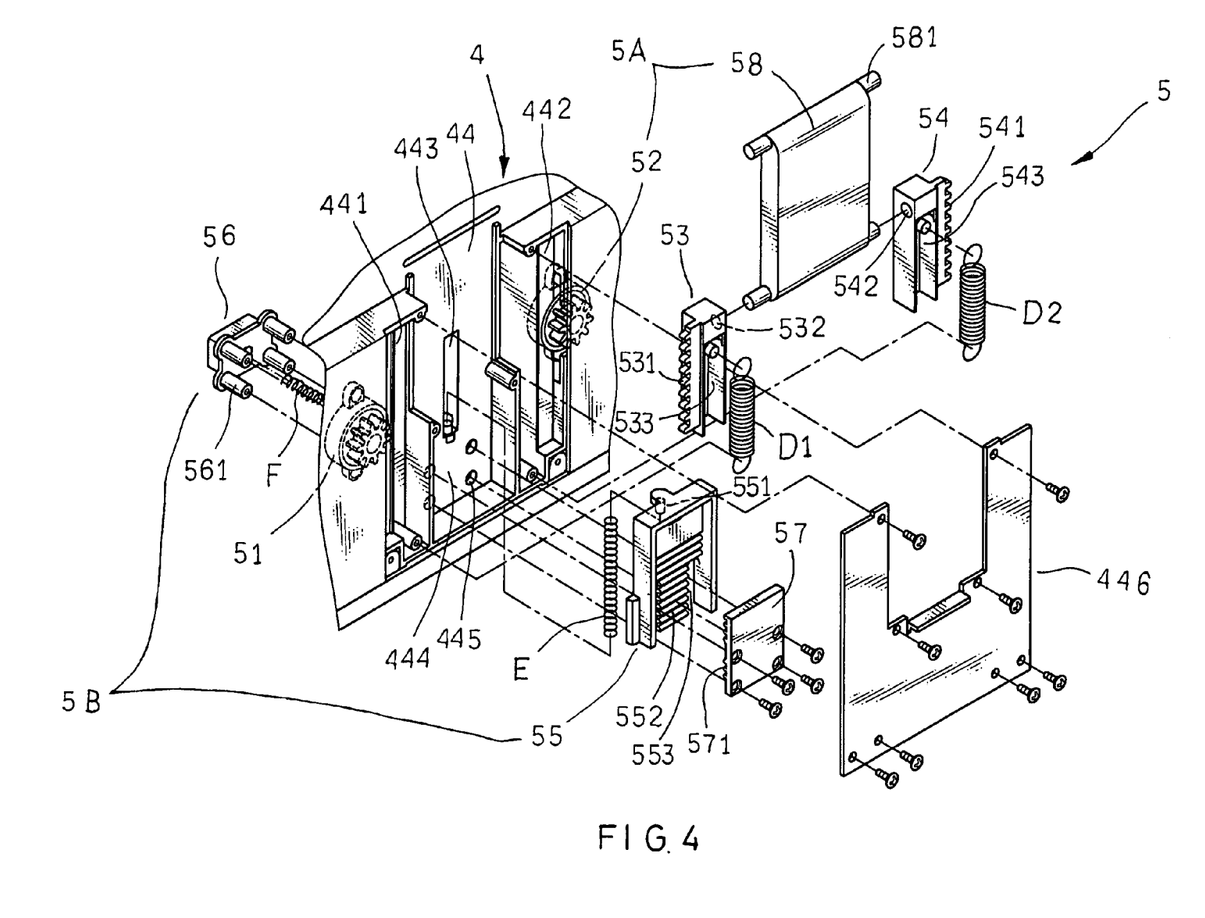
FIG. 4 is an exploded view of the upward folding adjustment means of the invention.
Figure 5:
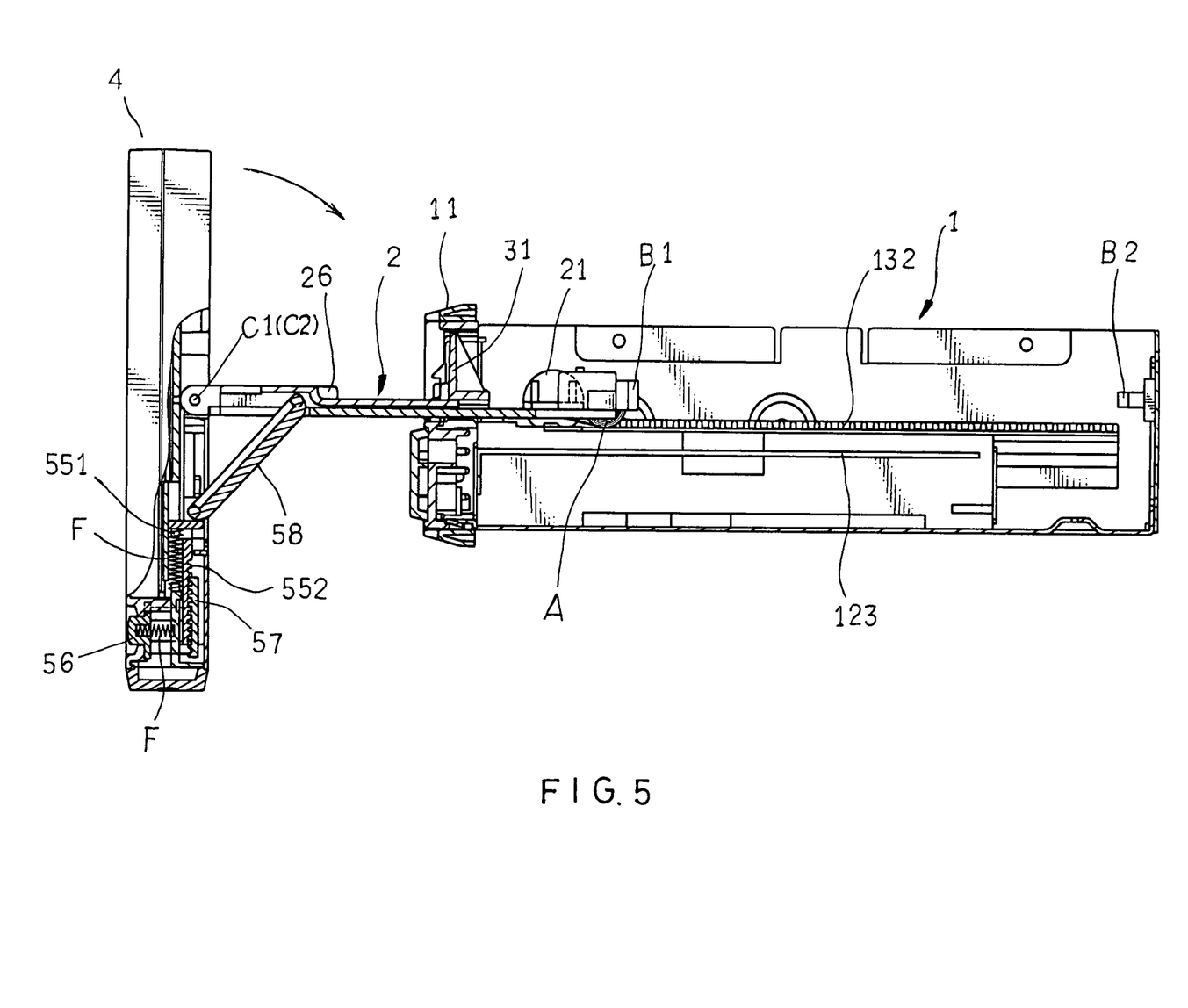
FIG. 5 is a sectional view of the invention in operating condition 1.
Figure 6:
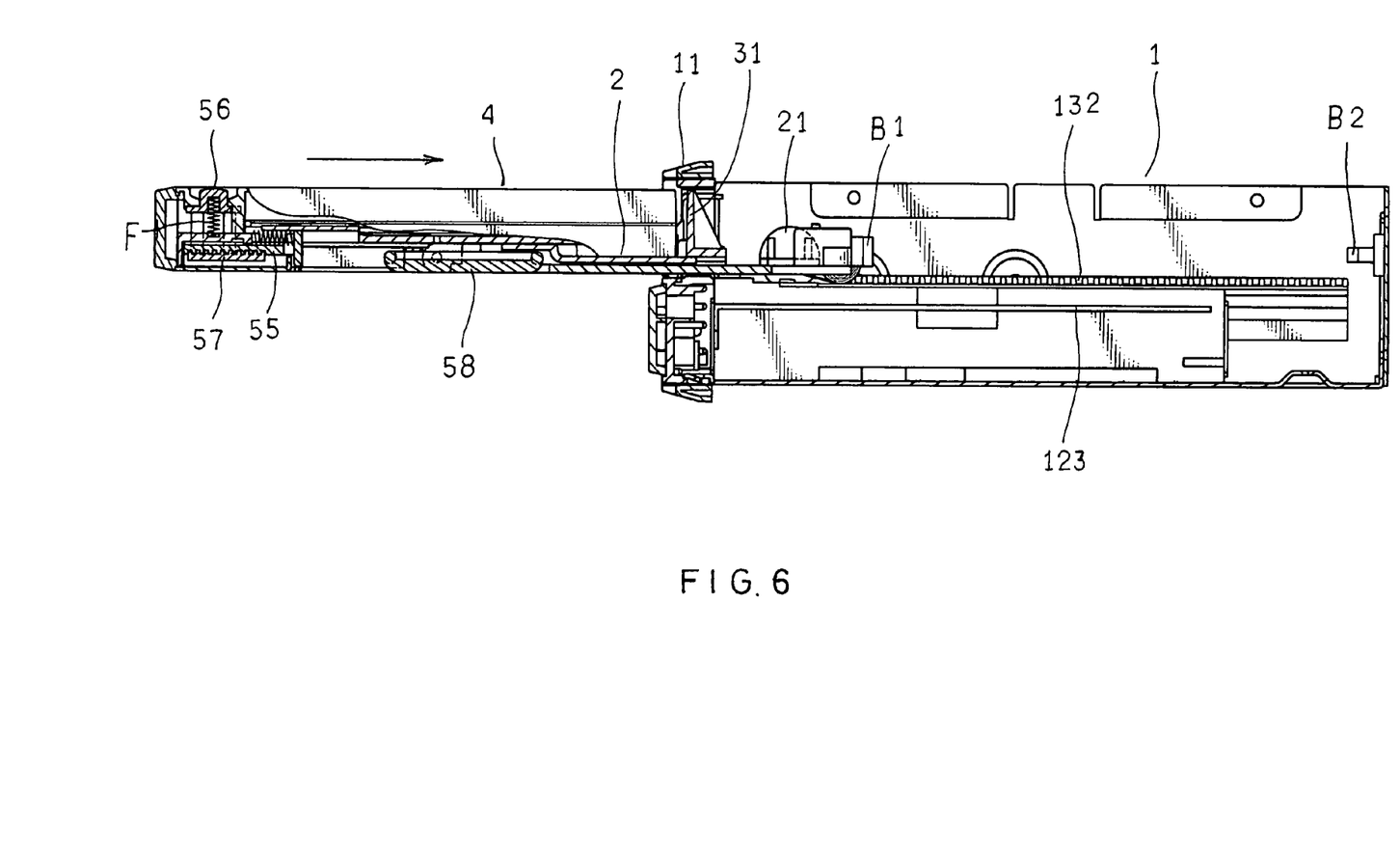
FIG. 6 is a sectional view of the invention in operating condition 2.
Figure 7:
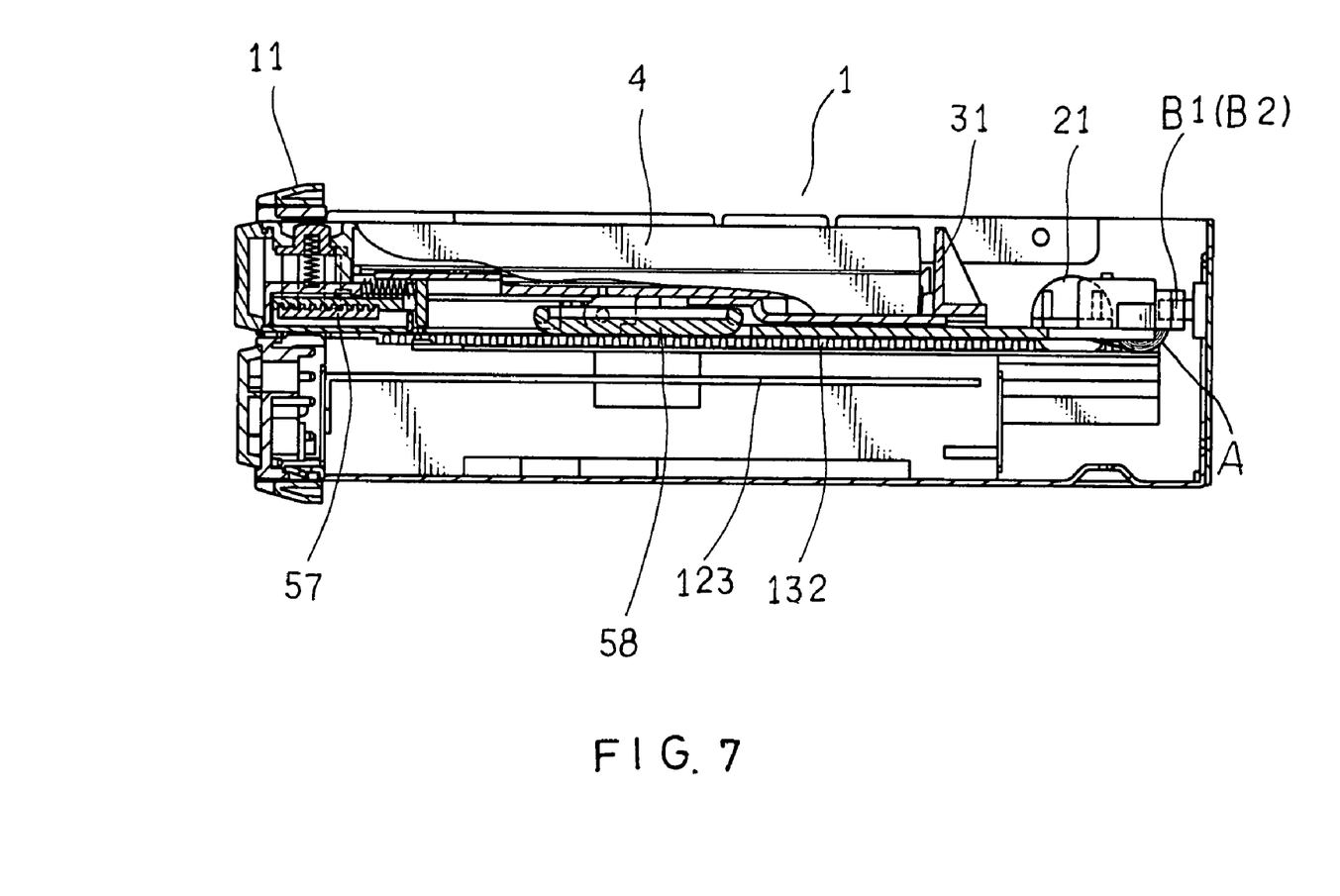
FIG. 7 is a sectional view of the invention in operating condition 3.
Figure 8:
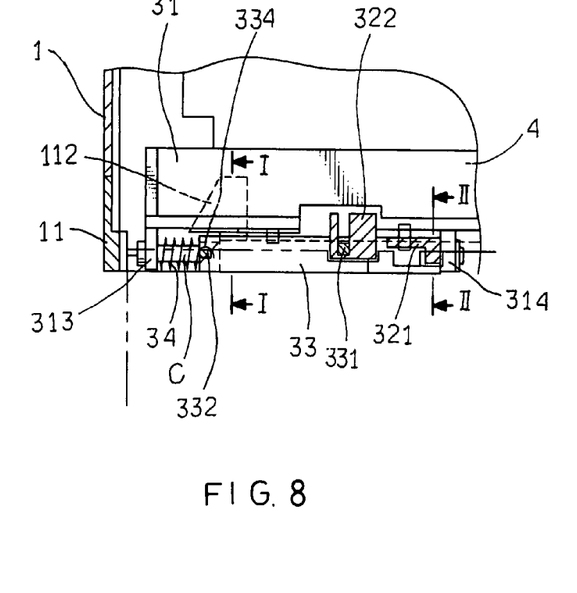
FIG. 8 is a sectional view of the coupling mechanism in an operating condition.
Figure 9:
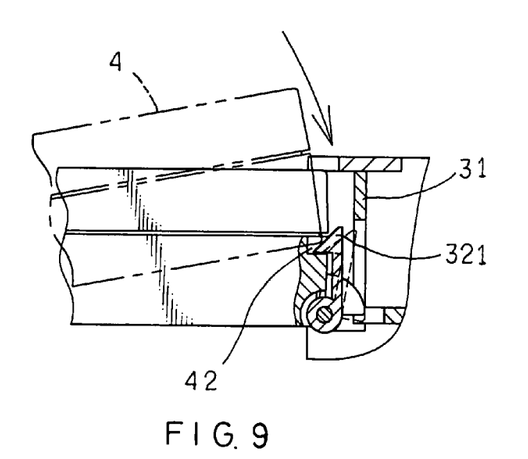
FIG. 9 is a cross section taken on line I—I in FIG. 8.
Figure 10:
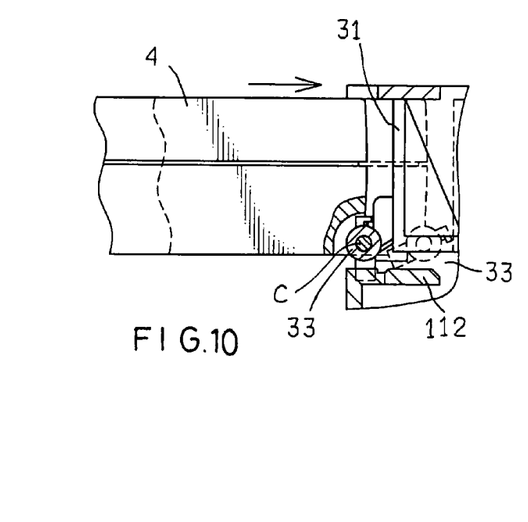
FIG. 10 is a cross section taken on line II—II in FIG. 8.
Figure 11:
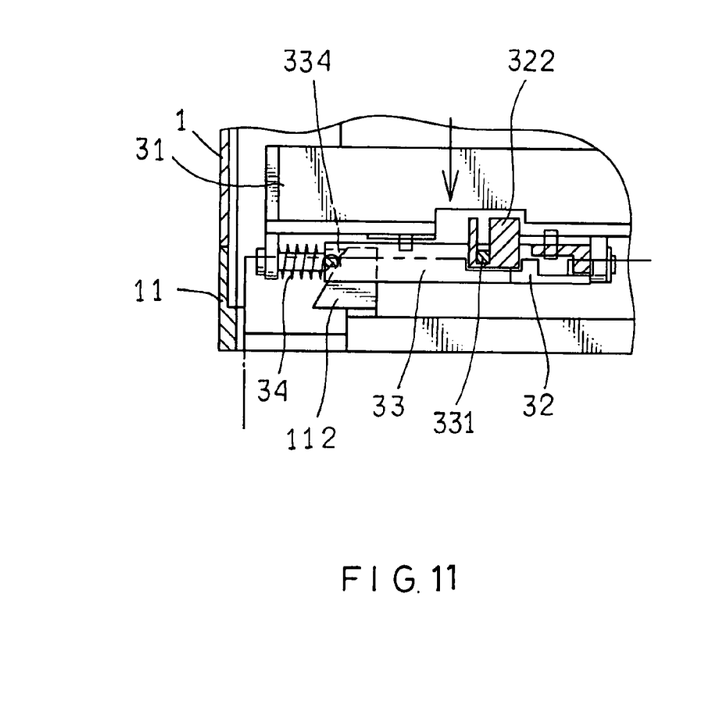
FIG. 11 is a sectional view of the coupling mechanism in operating condition 1.
Figure 12:
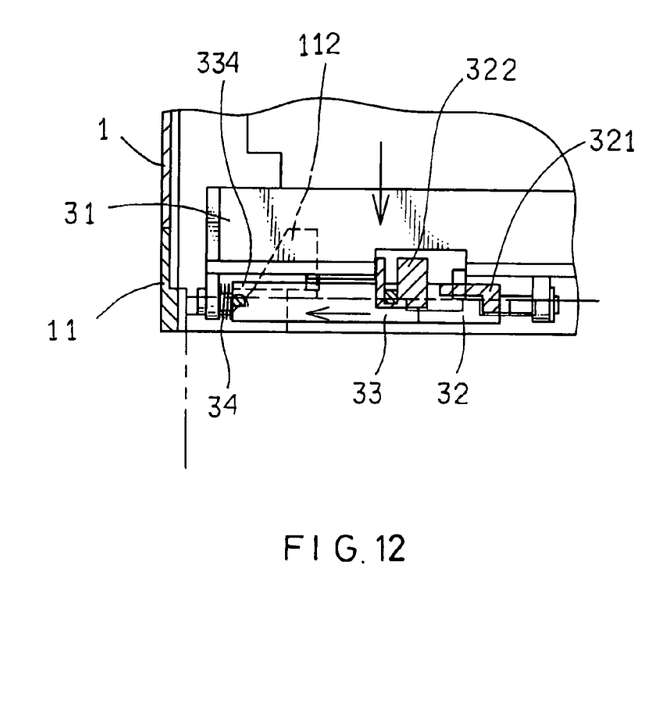
FIG. 12 is a sectional view of the coupling mechanism in operating condition 2.

The display panel holding mechanism 4 has a panel 41 for holding a LCD panel 40. The panel 41 has an upper edge forming a trough 42 corresponding to the hook 321 of the coupling mechanism 3. The trough 42 has a notch 421. In the middle portion of the back side of the panel 41, there are a first and a second pivot docks 45 and 43 on two sides corresponding to the first and second pivot seat 24 and 25 of the extendable deck 2, and are pivotally coupled with a shaft C1. The back side of the display panel holding mechanism 4 further has an upward folding adjustment means housing zone 44 which has respectively a sliding block housing trough 441 and 442 on two sides. In the center there are a spring housing trough 443 and a housing trough 444, and is covered by a cover plate 446.

The upward folding adjustment means 5 is located in the display panel holding mechanism 4 and is connected to the extendable deck 2. It includes an upward folding actuation assembly 5A and an angle adjustment assembly 5B.

The upward folding actuation assembly 5A is to actuate upward folding of the display panel holding mechanism 4. It includes:

two dampers 51 and 52 located respectively on the outer side of the sliding block housing trough 441 and 442 of the display panel holding mechanism 4;

two sliding members 53 and 54 that have one side forming gear racks 531 and 541 corresponding to the dampers 51 and 52, and a top edge forming axle holes 532 and 542. The sliding members 53 and 54 have respectively a spring housing trough 533 and 543 to house springs D1 and D2, and anchor one end of the springs D1 and D2. The springs D1 and D2 have other end anchored on the bottom of the sliding block housing trough 441 and 442; and an elevation angle push plate 58 which has respectively a stub shaft 581 extended outwards from two sides of the upper end and the lower end to couple with the connection deck 26 of the extendable deck 2 and the axle holes 532 and 542 of the sliding members 53 and 54.

The angle adjustment assembly 5B is to adjust and remember the turning elevation angle of the display panel holding mechanism 4. It includes:

an anchor member 55 which has a strut 551 on the front side to compress a spring E located in the spring housing trough 443, and an anchor gear rack 552 and two elongated notches 553 on the back side thereof; and an anchor push button 56 located on the front side of the display panel holding mechanism 4 that has a plurality of latch struts 561 to run through apertures 445 of the display panel holding mechanism 4 to fasten to an anchor plate 57 on the back side of the display panel holding mechanism 4, and is pressed by a spring F in normal conditions. The anchor plate 57 has a gear rack 571 corresponding to the anchor gear rack 552 of the anchor member 55.

By means of the construction set forth above (referring to FIGS. 5 through 12), when an user wants to retract and store the LCD panel 40, he/she only has to push and turn the LCD panel 40 to become horizontal. The display panel holding mechanism 4 is turned about the shafts C1 and C2 of the first and second hubs 32 and 33 that serve as the axes; the elevation angle push plate 58 of the upward folding actuation assembly 5A is driven and turned rearwards because the trough 42 of the panel 41 rams the slant surface of the hook 321 of the first hub 32 when the panel 41 is turned horizontally. After the trough 42 has passed over the slant surface of the hook 321, the returning elastic force of the torsional spring 34 moves the hook 321 into the trough 42 (meanwhile the L-shaped strut 332 is upright, will be discussed later). Therefore the display panel holding mechanism 4 is prevented from returning. User can continuously push the display panel holding mechanism 4 into the case 1, and the push lugs 22 and 23 push the elastic reeds A on two sides of the case 1 to extend. When the extendable deck 2 is moved to the rear side of the case 1, the binary switch B1 is latched on the latch tongue B2 to prevent the extendable deck 2 from being extended outwards. Thus the display panel holding mechanism 4 may be housed and stored.

When the user wants to unload the display panel holding mechanism 4 for viewing, push the display panel holding mechanism 4 again, the binary switch B1 is released from the latch tongue B2, the winding elastic force of the elastic reed A pushes the push lugs 22 and 23, and the extendable deck 2 is extended outside the case 1. Meanwhile the damper 21 is engaged with the gear rack 132 of the second channeling mechanism 13 to decelerate the motion so that the extendable deck 2 won't be moved out too quickly. Once the extendable deck 2 is completely outside the case 1, the slant bucking block 334 of the second hub 33 will be pushed by the slant surface of the slant bucking member 112 of the face panel 11 to force the first and second hubs 32 and 33 to compress the torsional spring 34, and the hook 321 of the first hub 32 is moved from the trough 42 to the notch 421 on another side thereby the display panel holding mechanism 4 escapes the constraint of the hook 321 and the extendable deck 2 is completely moved outside of the case 1 to be anchored. The partition 31 of the coupling mechanism 3 is pushed by the returning elastic force of the torsional spring 34 and extended forwards to lift the display panel holding mechanism 4 upright so that users can see the LCD panel 40.

Figure 13:
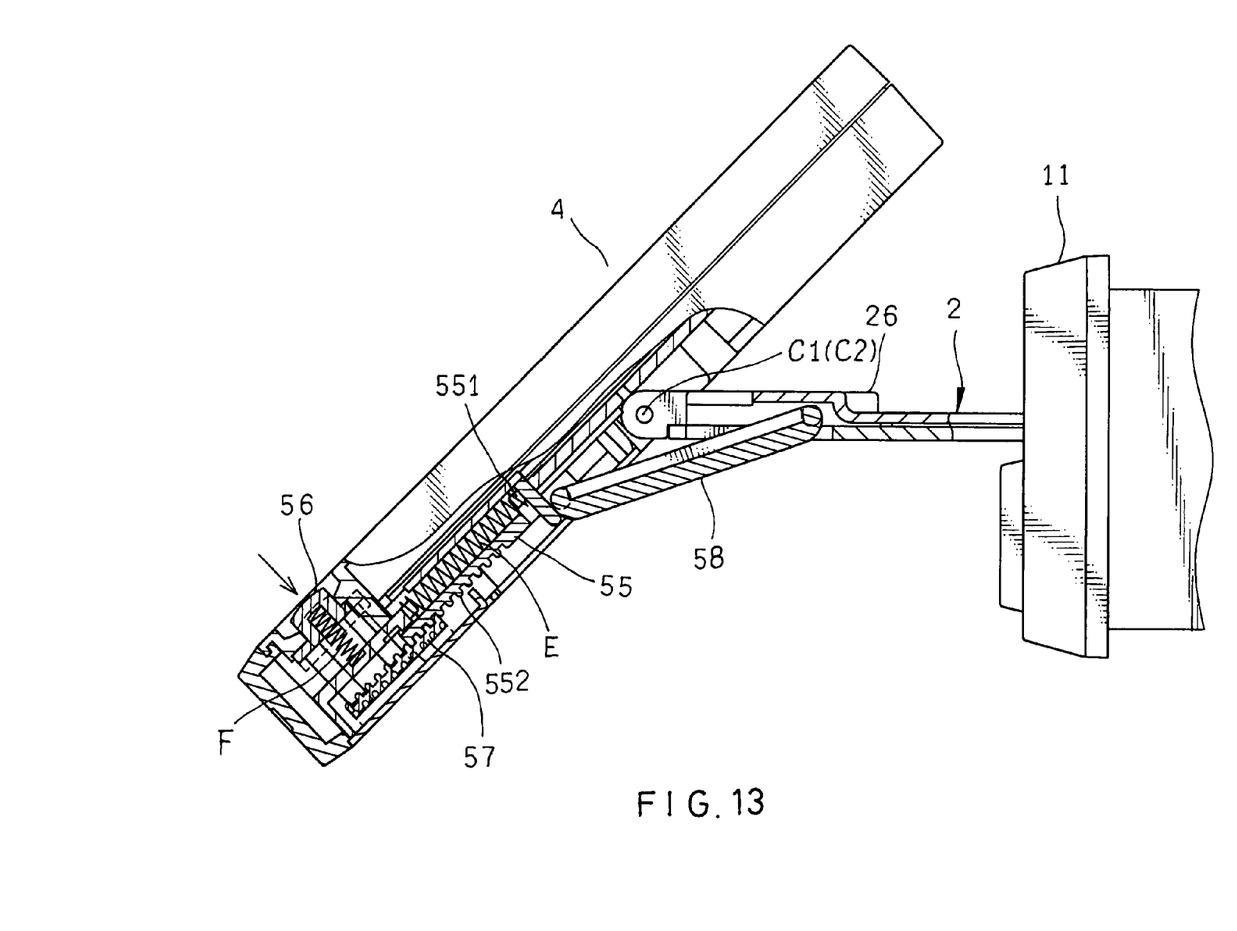
FIG. 13 is a schematic view of the upward folding adjustment means in operating condition 1.
Figure 14:
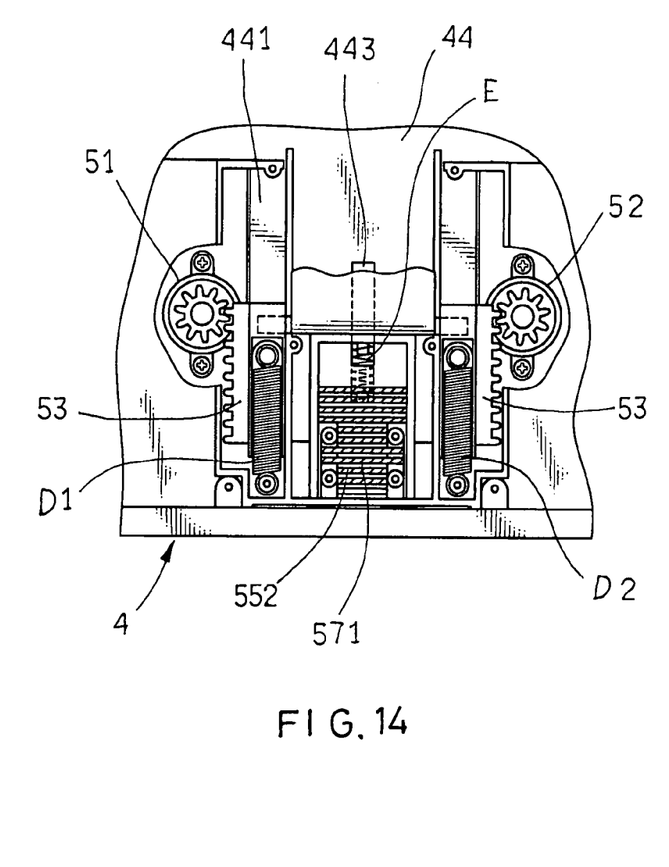
FIG. 14 is a schematic view of the upward folding adjustment means in operating condition 2.
Figure 15:
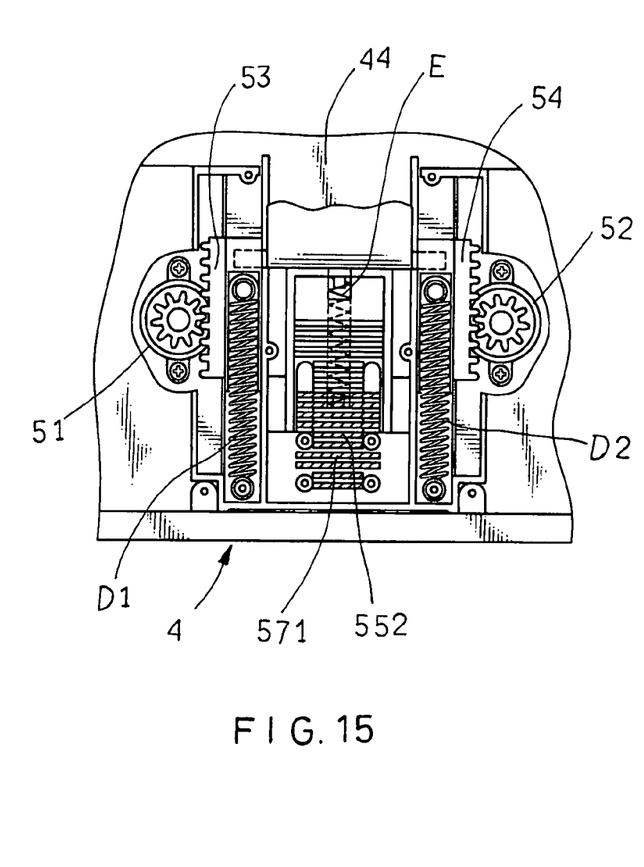
FIG. 15 is a schematic view of the upward folding adjustment means in operating condition 3.

Referring to FIGS. 13, 14 and 15, adjusting and anchoring the viewing angle of the display panel is accomplished through the angle adjustment assembly 5B. In normal conditions, the springs D1 and D2 pull the sliding members 53 and 54 to make the LCD panel 40 in an upright position. The anchor push button 56 and the gear racks 552 and 571 of the anchor member 55 may be adjusted to different elevations to drive the sliding members 53 and 54 and alter the position of the elevation angle push plate 58. Therefore user needs only to depress the anchor push button 56 and move the LCD panel 40 to a desired elevation angle for viewing, then release the anchor push button 56 to complete the angular adjustment. When the LCD panel is stored and unloaded next time, it automatically turns to the angle set previously. Thus it can remember the adjusted angle for later use.

In summary, the mechanical operation provided by the invention is less likely to incur malfunction, and can replace the expensive electronic circuit control, and can automatically and rapidly unload or retract and store the display panel. The viewing angle may also be adjusted to suit user's requirements. And once adjusted, the invention can remember the adjusted angle for later use.

I claim:

1. A mechanical and automatic liquid crystal display device comprising a case, an extendable deck, a coupling mechanism, a display panel holding mechanism and an upward folding adjustment device, wherein:

the case is hollow and has a window and a first channeling mechanism and a second channeling mechanism located respectively on two sides corresponding to each other to guide the extendable deck to retract inwards or extend outwards at desired locations;

the extendable deck has a front side pivotally engaged with the display panel holding mechanism and is coupled with the first channeling mechanism and the second channeling mechanism for positioning;

the coupling mechanism is located on one side of the extendable deck to control folding, latching and releasing of the display panel holding mechanism;

the display panel holding mechanism has a panel to hold a LCD panel; and the upward folding adjustment device is located in the display panel holding mechanism and connected to the extendable deck and has an upward folding actuation assembly guiding the display panel holding mechanism for folding upwards and storing, the upward folding adjustment device selectively adjusting the display panel holding mechanism to one of a plurality of turning elevation angles and returning the display panel holding mechanism to a previously selected turning elevation angle selected from the plurality of turning elevation angles;

wherein the LCD panel is foldable upwards and storable in the case;

wherein the upward folding actuation assembly includes two dampers, two sliding members, and an elevation angle push plate.

2. The mechanism and automatic liquid crystal display device of claim 1, wherein each of the sliding member has a gear rack on one side, and an axle hole on one side of a top section to pivotally couple with the elevation angle push plate.

3. The mechanism and automatic liquid crystal display device of claim 1, wherein the elevation angle push plate has respectively a stub shaft extended outwards from two end sides to couple with the extendable deck and the two sliding members.

4. A mechanical and automatic liquid crystal display device comprising a case, an extendable deck, a coupling mechanism, a display panel holding mechanism and an upward folding adjustment device, wherein:

the case is hollow and has a window and a first channeling mechanism and a second channeling mechanism located respectively on two sides corresponding to each other to guide the extendable deck to retract inwards or extend outwards at desired locations;

the extendable deck has a front side pivotally engaged with the display panel holding mechanism and is coupled with the first channeling mechanism and the second channeling mechanism for positioning;

the coupling mechanism is located on one side of the extendable deck to control folding, latching and releasing of the display panel holding mechanism;

the display panel holding mechanism has a panel to hold a LCD panel; and the upward folding adjustment device is located in the display panel holding mechanism and connected to the extendable deck and has an upward folding actuation assembly guiding the display panel holding mechanism for folding upwards and storing, the upward folding adjustment device selectively adjusting the display panel holding mechanism to one of a plurality of turning elevation angles and returning the display panel holding mechanism to a previously selected turning elevation angle selected from the plurality of turning elevation angles;

wherein the LCD panel is foldable upwards and storable in the case;

wherein the upward folding adjustment device includes an angle adjustment assembly returning the display panel holding mechanism to the previously selected turning elevation angle; and wherein the angle adjustment assembly further includes an anchor member, an anchor push button and an anchor plate.

5. The mechanism and automatic liquid crystal display device of claim 4, wherein the anchor member includes a strut on a front side thereof to compress a spring located in a spring housing trough, and an anchor gear rack on a back side thereof.

6. The mechanism and automatic liquid crystal display device of claim 4, wherein the anchor push button is located on a front side of the display panel holding mechanism and has a plurality of latch struts running through the display panel holding mechanism to fasten to the anchor plate on a back side of the display panel holding mechanism, the anchor plate having a gear rack corresponding to an anchor gear rack of the anchor member.

7. A mechanical and automatic liquid crystal display device comprising a case, an extendable deck, a coupling mechanism, a display panel holding mechanism and an upward folding adjustment device, wherein:

the case is hollow and has a window and a first channeling mechanism and a second channeling mechanism located respectively on two sides corresponding to each other to guide the extendable deck to retract inwards or extend outwards at desired locations;

the extendable deck has a front side pivotally engaged with the display panel holding mechanism and is coupled with the first channeling mechanism and the second channeling mechanism for positioning;

the coupling mechanism is located on one side of the extendable deck to control folding, latching and releasing of the display panel holding mechanism;

the display panel holding mechanism has a panel to hold a LCD panel; and the upward folding adjustment device is located in the display panel holding mechanism and connected to the extendable deck and has an upward folding actuation assembly guiding the display panel holding mechanism for folding upwards and storing, the upward folding adjustment device selectively adjusting the display panel holding mechanism to one of a plurality of turning elevation angles and returning the display panel holding mechanism to a previously selected turning elevation angle selected from the plurality of turning elevation angles;

wherein the LCD panel is foldable upwards and storable in the case;

wherein the coupling mechanism includes a partition, a first hub and a second hub; and wherein the first hub is hollow for housing an axle and has a hook on one side that has a slant surface and a projection on another side, the projection having a trough on a rear side thereof.

8. A mechanical and automatic liquid crystal display device comprising a case, an extendable deck, a coupling mechanism, a display panel holding mechanism and an upward folding adjustment device, wherein:

the case is hollow and has a window and a first channeling mechanism and a second channeling mechanism located respectively on two sides corresponding to each other to guide the extendable deck to retract inwards or extend outwards at desired locations;

the extendable deck has a front side pivotally engaged with the display panel holding mechanism and is coupled with the first channeling mechanism and the second channeling mechanism for positioning;

the coupling mechanism is located on one side of the extendable deck to control folding, latching and releasing of the display panel holding mechanism;

the display panel holding mechanism has a panel to hold a LCD panel; and the upward folding adjustment device is located in the display panel holding mechanism and connected to the extendable deck and has an upward folding actuation assembly guiding the display panel holding mechanism for folding upwards and storing, the upward folding adjustment device selectively adjusting the display panel holding mechanism to one of a plurality of turning elevation angles and returning the display panel holding mechanism to a previously selected turning elevation angle selected from the plurality of turning elevation angles;

wherein the LCD panel is foldable upwards and storable in the case;

wherein the coupling mechanism includes a partition, a first hub and a second hub; and wherein the second hub is hollow for housing an axle and has a lug on one side corresponding to a trough formed on a projection of the first hub and a L-shaped strut extended outwards from another side, and a slant bucking block on another side opposite to the L-shaped strut.

9. A mechanical and automatic liquid crystal display device comprising a case, an extendable deck, a coupling mechanism, a display panel holding mechanism and an upward folding adjustment device, wherein:

the case is hollow and has a window and a first channeling mechanism and a second channeling mechanism located respectively on two sides corresponding to each other to guide the extendable deck to retract inwards or extend outwards at desired locations;

the extendable deck has a front side pivotally engaged with the display panel holding mechanism and is coupled with the first channeling mechanism and the second channeling mechanism for positioning;

the coupling mechanism is located on one side of the extendable deck to control folding, latching and releasing of the display panel holding mechanism;

the display panel holding mechanism has a panel to hold a LCD panel; and the upward folding adjustment device is located in the display panel holding mechanism and connected to the extendable deck and has an upward folding actuation assembly guiding the display panel holding mechanism for folding upwards and storing, the upward folding adjustment device selectively adjusting the display panel holding mechanism to one of a plurality of turning elevation angles and returning the display panel holding mechanism to a previously selected turning elevation angle selected from the plurality of turning elevation angles;

wherein the LCD panel is foldable upwards and storable in the case; and wherein the first channeling mechanism has a first elevation sustaining plate and a sliding rod coupling on a sliding block.

10. The mechanism and automatic liquid crystal display device of claim 9, wherein the first elevation sustaining plate has an elastic reel on a front edge thereof.

11. A mechanical and automatic liquid crystal display device comprising a case, an extendable deck, a coupling mechanism, a display panel holding mechanism and an upward folding adjustment device, wherein:

the case is hollow and has a window and a first channeling mechanism and a second channeling mechanism located respectively on two sides corresponding to each other to guide the extendable deck to retract inwards or extend outwards at desired locations;

the extendable deck has a front side pivotally engaged with the display panel holding mechanism and is coupled with the first channeling mechanism and the second channeling mechanism for positioning;

the coupling mechanism is located on one side of the extendable deck to control folding, latching and releasing of the display panel holding mechanism;

the display panel holding mechanism has a panel to hold a LCD panel; and the upward folding adjustment device is located in the display panel holding mechanism and connected to the extendable deck and has an upward folding actuation assembly guiding the display panel holding mechanism for folding upwards and storing, the upward folding adjustment device selectively adjusting the display panel holding mechanism to one of a plurality of turning elevation angles and returning the display panel holding mechanism to a previously selected turning elevation angle selected from the plurality of turning elevation angles;

wherein the LCD panel is foldable upwards and storable in the case; and wherein the second channeling mechanism has a second elevation sustaining plate and a gear rack.

12. The mechanism and automatic liquid crystal display device of claim 11, wherein the second elevation sustaining plate has an elastic reel on a front edge thereof.

* * * * *